United States Patent
Catania et al.

(10) Patent No.: US 7,509,651 B2
(45) Date of Patent: Mar. 24, 2009

(54) SYSTEM AND METHOD FOR PROVIDING EVENT NOTIFICATIONS TO INFORMATION TECHNOLOGY RESOURCE MANAGERS

(75) Inventors: Nicolas Catania, Palo Alto, CA (US); Bryan P. Murray, Duvall, WA (US); M. Homayoun Pourheidari, Mountain View, CA (US); Guillaume N. Vambenepe, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1036 days.

(21) Appl. No.: 10/445,237

(22) Filed: May 23, 2003

(65) Prior Publication Data

US 2005/0015472 A1      Jan. 20, 2005

(51) Int. Cl.
*G06F 9/54* (2006.01)
*G06F 9/46* (2006.01)
*G06F 15/16* (2006.01)

(52) U.S. Cl. .................. 719/316; 719/318; 719/328; 709/223

(58) Field of Classification Search .......... 719/316, 719/318, 328; 709/223
See application file for complete search history.

(56) References Cited

U.S. PATENT DOCUMENTS

| | | | | |
|---|---|---|---|---|
| 5,485,617 A | * | 1/1996 | Stutz et al. | 719/315 |
| 6,058,420 A | * | 5/2000 | Davies | 709/224 |
| 6,253,243 B1 | * | 6/2001 | Spencer | 709/224 |
| 6,487,590 B1 | * | 11/2002 | Foley et al. | 709/223 |
| 6,996,500 B2 | * | 2/2006 | O'Konski et al. | 702/186 |
| 7,035,944 B2 | * | 4/2006 | Fletcher et al. | 709/250 |
| 7,099,931 B2 | * | 8/2006 | Da Palma et al. | 709/220 |
| 2002/0123966 A1 | * | 9/2002 | Chu et al. | 705/43 |
| 2002/0184401 A1 | * | 12/2002 | Kadel et al. | 709/315 |
| 2003/0061365 A1 | * | 3/2003 | White et al. | 709/229 |
| 2004/0059966 A1 | * | 3/2004 | Chan et al. | 714/48 |
| 2004/0070604 A1 | * | 4/2004 | Bhat et al. | 345/741 |
| 2006/0168159 A1 | * | 7/2006 | Weisman et al. | 709/220 |

* cited by examiner

*Primary Examiner*—Li B Zhen

(57) ABSTRACT

A managed object implements an interface that includes information regarding events that can occur during operation of the managed object and other resources and managed objects. A manager can subscribe to receive a notification when one or more of the events occur in a pull mode where the notifications are sent only when requested by the manager. The manager can also subscribe to receive notification of the events in a push mode where the managed objects send the notifications to the manager when the events occur.

14 Claims, 12 Drawing Sheets

SYSTEM AND METHOD FOR PROVIDING EVENT NOTIFICATIONS TO INFORMATION TECHNOLOGY RESOURCE MANAGERS

RELATED APPLICATIONS

The disclosed system and operating method are related to subject matter disclosed in: (1) U.S. patent application Ser. No. 10/438,716, entitled "System and Method for Managing Web Services"; and (2) U.S. patent application Ser. No. 10/445,157, entitled "System and Method for Collectively Managing Information Technology Resources"; which are incorporated herein in their entirety.

COMPUTER PROGRAM LISTING APPENDIX

This specification includes Appendix A (consisting of five text files) on CD-ROM, which contains interface description documents that can be used with some embodiments of the invention. Appendix A is incorporated herein by reference.

BACKGROUND

Today, information technology (IT) resources are managed using a variety of incompatible and often proprietary interfaces and protocols. Requirements for management information regarding the resources need to be specifically programmed to address new resources and in many cases the specific programming is not updated as new versions of the IT resources become available.

The problem of managing disparate IT resources is becoming more acute as systems are increasingly developed using IT resources that are deployed in remote locations and accessed via information networks, such as the Internet. Generally, the resources to be managed are not readily identifiable when the resources are highly distributed and independent of one another. Further, it is difficult to obtain information regarding properties and attributes of the resources, and protocols for exchanging management information with the resources. A further difficulty lies in determining the relationships among the resources used in a system to pinpoint operational problems when one or more of the resources do not respond as expected.

The term Web services, also referred to herein as "services", describes an approach to distributed computing in which interactions are carried out through the exchange of eXtensible Markup Language (XML) messages. Web services can perform any task that can be described and contained within one or more modules of code. Essentially any transaction or bit of business logic can become a Web service if it can be accessed and used by another system over the Internet.

A Web service is a software system identified by a Universal Resource Identifier (URI) whose public interfaces and bindings are typically defined and described in an XML document. The description can be discovered by other software systems. These systems may then interact with the Web service in a manner prescribed by its definition, using XML based messages conveyed by Internet protocols.

The Web services architecture is based upon the interactions between three primary roles: service provider, service registry, and service requester. These roles interact using publish, find and bind operations. The service provider is the entity that provides access to the Web service and publishes the service description in a service registry. The service requestor finds the service description in a service registry or other location and can use the information in the description to bind to a service.

Web services typically send XML messages formatted in accordance with the Simple Object Access Protocol (SOAP) specification. The SOAP specification is a universally agreed-upon protocol that can use XML and HTTP together to invoke functions exposed in Web services.

The XML messages are described using the Web Services Description Language (WSDL) specification, which, along with the Universal Description Discovery and Integration (UDDI) registry, provides a definition of the interface to a Web service and identifies service providers in a network. The WSDL specification is an XML-based language used to define Web services and describe how to access them. An application trying to use a particular Web Service can often use WSDL to find the location of the Web service, the function calls available, and the format that must be followed to access the Web service. Therefore, the client first obtains a copy of the WSDL file from the server and then uses the information in this file to format a SOAP request.

The UDDI registry supports Web services by providing a place for a company to register its business and the Web services that it offers. Users that need a Web service can use this registry to find a business that provides the service.

SUMMARY

In one embodiment, a system for issuing event notifications, comprises a computer processor, and a first managed object executable on the computer processor. The first managed object includes a managed object interface configured to include information regarding at least one event that can occur during execution of the first managed object; an operation that receives a subscription from at least one manager to notify the at least one manager of the occurrence of the at least one event; and an operation that issues a notification of the at least one event to the at least one manager.

In another embodiment, a computer product comprises an event interface configured to receive a subscription from at least one manager to notify at least one manager of the occurrence of at least one event.

In yet another embodiment, a method for issuing event notifications to managed objects comprises subscribing with the managed objects to receive notification of events; determining the severity and source of each event received; determining whether the event is a fault; determining the source of the fault when the event is a fault; and propagating a status value indicative of the fault to all managed objects that are affected by the fault.

Various other features of embodiments of the invention will be more fully understood upon consideration of the detailed description below, taken together with the accompanying figures.

DETAILED DESCRIPTION OF THE FIGURES

Figure 1:
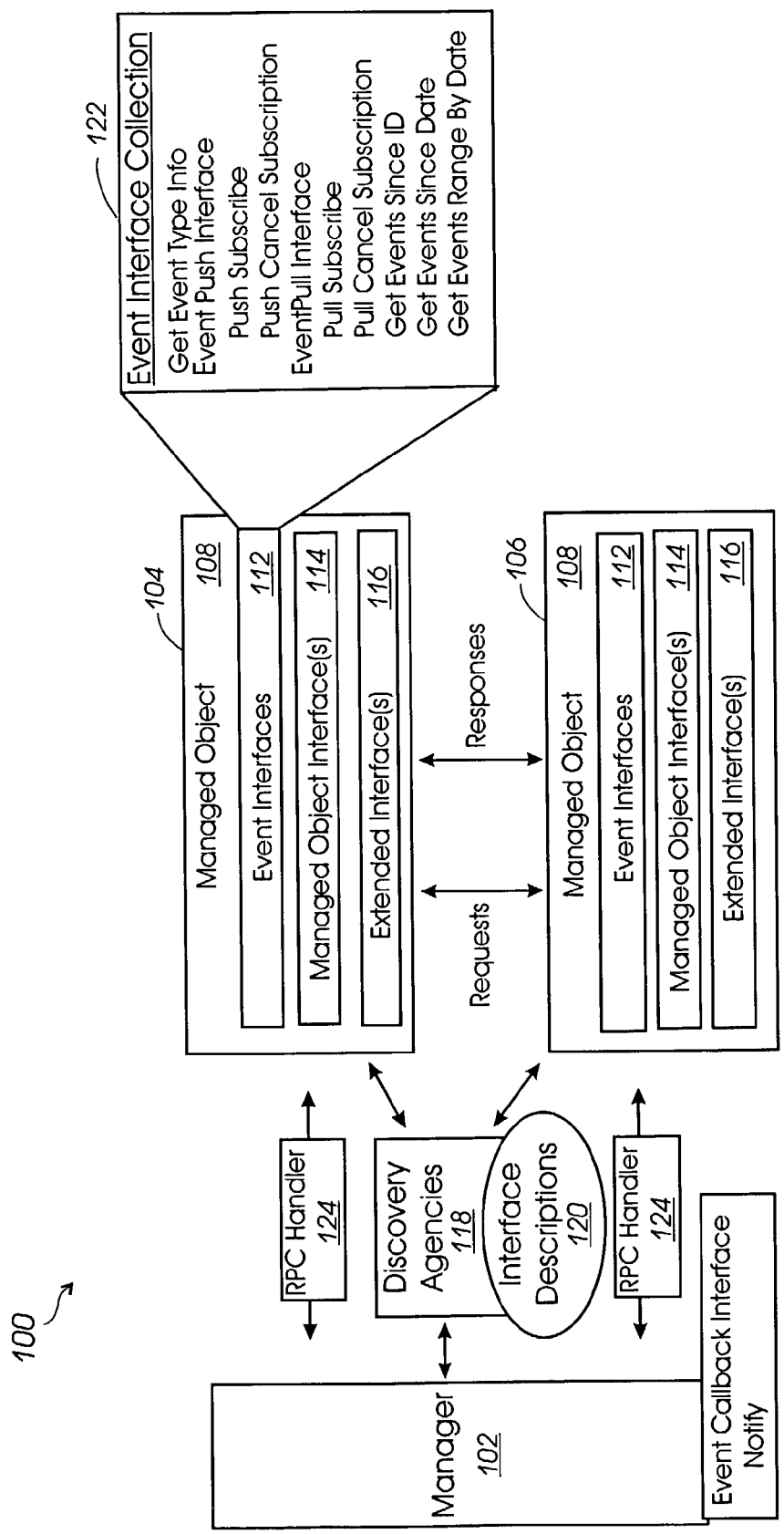
FIG. 1 is a diagram of components included in an embodiment of a system for providing event notifications to information technology resource managers.

Referring to FIG. 1, an embodiment of event notification system 100 that allows manager 102 to monitor and control information technology (IT) resources in one or more domains 104, 106 is shown. The resources can be any type of software, hardware, and/or firmware that is configured to interface with manager 102. Resources that are configured to interface with manager 102 are represented by managed objects 108.

Event interfaces 112, managed object interfaces 114, and extended interfaces 116 allow manager 102 to access information to monitor, audit, and control various aspects of resources represented by managed objects 108, and to register to receive event notifications. Manager 102 can also use information in interfaces 112, 114, 116 to determine management attributes and relationships among related managed objects 108.

Managed objects 108 interface with the underlying resources to gather information to populate data fields in interfaces 112, 114, 116 that are available to manager 102. Further, managed objects 108 receive information and control parameters from manager 102 via interfaces 112, 114, 116. Interfaces 112, 114, 116 can be implemented within managed objects 108, such as shown for managed object 108 in FIG. 1, or in a layer external to managed object 108. Similarly, managed objects 108 can be implemented internally or externally to the resources they represent.

Event notification system 100 defines notification syntax and processing rules to inform one or more managers 102 that an event has occurred. An event is a state change in a managed object 108. A notification can also be used to share informational events. In one embodiment, there are two interfaces that can be used to get this information in either a push mode or a pull mode. In the push mode, managed object 108 (notifier) issues a notification to the subscribers to inform them of a change of state when an event occurs. In the pull mode, the subscriber issues calls to one or more managed objects 108 to request all the notifications that happened since the last pull call.

Event notification system 100 allows bulk notification operations for efficiency. For example, in the pull mode, notifications from more than one type can be retrieved through a single call. In the push mode, the subscriber can subscribe to more than one notification in one single subscribe call.

In the embodiment shown, manager 102 can subscribe to receive notification of events via one or more interfaces in Event Interface Collection 122. The embodiment of Event Interface Collection 122 shown includes Get Event Info operation, Event Push Interface, Event Pull Interface, and Event Callback Interface. Managed objects 108 implement event Push Interface and Event Pull Interface, while Event Callback Interface is implemented by subscribers, such as manager 102, to the events.

The embodiment of Event Push Interface shown includes Get Event Type Info operation, Push Subscribe operation, and Push Cancel Subscription operation. The operation Push Subscribe (EventTypes, CallbackUrl, ExpirationTime) allows manager 102 to register to receive a notification when any of a list of event types occur. The types of events available for Event Interface Collection 120 are determined by manager 102 via the Get Event Type Info operation. In some embodiments, the return value from the Push Subscribe operation is a subscription ID.

Manager 102 can pass the subscription identifier to the Push Cancel Subscription operation to stop receiving notifications for the specified event types. The subscription can expire automatically after the expiration of a pre-specified time period. Manager 102 can invoke the Push Subscribe operation again to continue to receive event notifications.

In the embodiment of Event Pull Interface shown in FIG. 1, Pull Subscribe (EventTypes, ExpirationTime) represents an operation that allows manager 102 to subscribe to receive notifications of specified event types as requested by Manager 102. Managed object 108 can cache events of the types specified for later retrieval using operations such as: GetEventsSinceId, GetEventsSinceDate, and GetEventsRangeByDate. The types of events available for Event Interface Collection 120 can be determined by manager 102 via the Get Event Type Info operation. Pull Subscribe returns an identifier for the subscription. Manager 102 can pass the subscription identifier to the Pull Cancel Subscription operation to stop receiving notifications for the specified event types. The subscription can expire automatically after a prespecified period of time expires, at which time the specified event types will no longer be cached for that subscription. In order to continue to receive events of this type, manager 102 can re-subscribe for the desired event types.

Managed object 108 saves events for all types specified in all subscriptions. If no subscription has specified some event type, all events of that type may be discarded. When a subscription is cancelled or expires, the queued event types may be discarded if no other subscriptions have expressed interest in the same event types. Each implementation can specify the time period to determine when subscriptions expire and how long events are saved before they are discarded.

Pull Cancel Subscription (SubscriptionId) represents an operation that allows manager 102 to indicate the termination of interest in event types from previously registered subscriptions. The subscription identifier passed to this operation is typically the identifier returned from a previous call to Pull Subscribe.

Get Events Since Id (SubscriptionId, EventId) represents an operation that retrieves all events that have occurred since the event specified by the EventId. Only the events of the type specified by the previous subscription will be returned.

Get Events Since Date (SubscriptionId, Date) represents an operation that retrieves all events that have occurred since the specified date and time. In some embodiments, only the events of the type specified by the previous subscription will be returned.

Get Events Range By Date (SubscriptionId, StartDate, EndDate) represents an operation that retrieves all events that occurred in the specified date range. Only the events of the type specified by the previous subscription will be returned. In order to avoid missing any events, the date range can be inclusive of the endpoints.

Event Callback Interface includes Notify (notifications) operation, which can be provided by a subscriber to push events. When managed object 108 undergoes a state change that results in one or more event to which a subscriber has registered, managed object 108 invokes the Notify operation in the Event Callback Interface provided by the subscriber with a corresponding list of notifications. A subscriber implements Event Callback Interface in order to receive the notifications.

Notifications are used in event notification system 100 to capture and correlate events from the Managed Objects. One or more notifications can be sent in any suitable format, such as a SOAP body. In one embodiment, the notification includes some or all of the following information:

Source, which can be any identifier that identifies the notifier;

Severity, which indicates a severity level for the notice;

Type, which classifies the notifications;

Identifier, which is a unique identifier for the notification generated;

CorrelationId, which is used to bind a set of notifications in the same context;

Timestamp, which is the time the notification was issued;

Expiration, which is the time the notification will expire;

Message, which describes the associated event; and

CorrectiveMessage, which suggests a corrective action.

Other information can be included in a notification in addition to, or instead of, one or more of the items of information described above.

In some embodiments, event notification system 100 supports a request/response model between manager 102 and managed objects 108, as well as between managed objects 108. In some further embodiments, if there is an error in a request or with the processing of a request, a SOAP fault message is returned instead of the response. A SOAP fault includes a fault code, a fault string, a fault actor, and an error detail.

In some embodiments, if the error is from the requester, the SOAP Fault code will use the value "Client". If the error is from a responder, the SOAP Fault code can use the value "Server". The fault detail can include an error message with information such as the error number, the error code, and a descriptive error message. The error message may contain multiple error elements to describe multiple failures.

The following is an example of a fault reflecting an error in a client request:

```
<s:Envelope xmlns:s=" http://soap/envelope/">
  <s:Body>
    <s:Fault>
      <faultcode>s:Server</faultcode>
      <faultstring>Fault detected in the managed object.</faultstring>
      <detail>
        <w:wsmfDetail xmlns:w="
            http://schemas.hp.com/wsmf/2003/01/faults/">
          <w:Error>
            <w:ErrorCode>http://faults/ResourceException
            </w:ErrorCode>
            <w:Message>The underlying resource is not
              responding.
            </w:Message>
          </w:Error>
          <w:Error>
            <w:ErrorCode>http//faults//ImplException
            </w:ErrorCode>
            <w:Message>An unexpected exception occurred while
                processing the request.
            </w:Message>
          </w:Error>
        </w:wsmfDetail>
      </detail>
    </s:Fault>
  </s:Body>
</s:Envelope>
```

One embodiment of a group of fault details for event notification system 100 includes the following:

| | |
|---|---|
| Invalid Operation | Operation does not exist on managed object. |
| Missing Param | An expected operation element or operation parameter is missing. |
| Invalid Param | Unexpected operation element in request. Parameter name does not match managed object operation signature. |
| Operation Failed | General failure invoking managed object operation. |
| Unavailable Attribute | Managed object attribute is unavailable. |
| Not Implemented | Managed object implementation is missing. Request cannot be completed because the implementation is missing or required services are missing. |
| Fatal | Managed object operation encountered an unrecoverable error. Behavior of the managed object is undefined. |
| Access Denied | The request cannot be fulfilled due to access controls. |
| Resource Exception | The managed object returned an error or exception while servicing the request. |
| Impl Exception | Unexpected error or exception from the managed object implementation. |
| Not Found | The requested managed object does not exist. |

Other suitable fault messages can be utilized in addition to, or instead of, the preceding fault messages.

Various implementations of interfaces 112, 114, 116 can hide selected management capabilities from managers 102 that are not authorized to access the selected management capabilities. Managed object interfaces 114 provide a common set of management features for all resources, while extended interfaces 116 provide access to additional management features and information depending on the particular resource being managed. Extended interfaces 116 can be implemented as needed. Managed objects 108, event interfaces 112, managed object interfaces 114, and extended interfaces 116 can be implemented in any suitable languages and formats.

In some embodiments, manager 102 and managed objects 108 can communicate with one or more discovery agencies 118 to access interface descriptions 120 for event interfaces 112, managed object interfaces 114, and extended interfaces 116. Interface descriptions 120 can be configured to expose some or all of the management features that are available through particular interfaces 112, 114, 116 to manager 102. Examples of WSDL interface descriptions 120 that can be used with some embodiments of event notification system 100 are provided in the Appendix filed with this disclosure.

Figure 4:
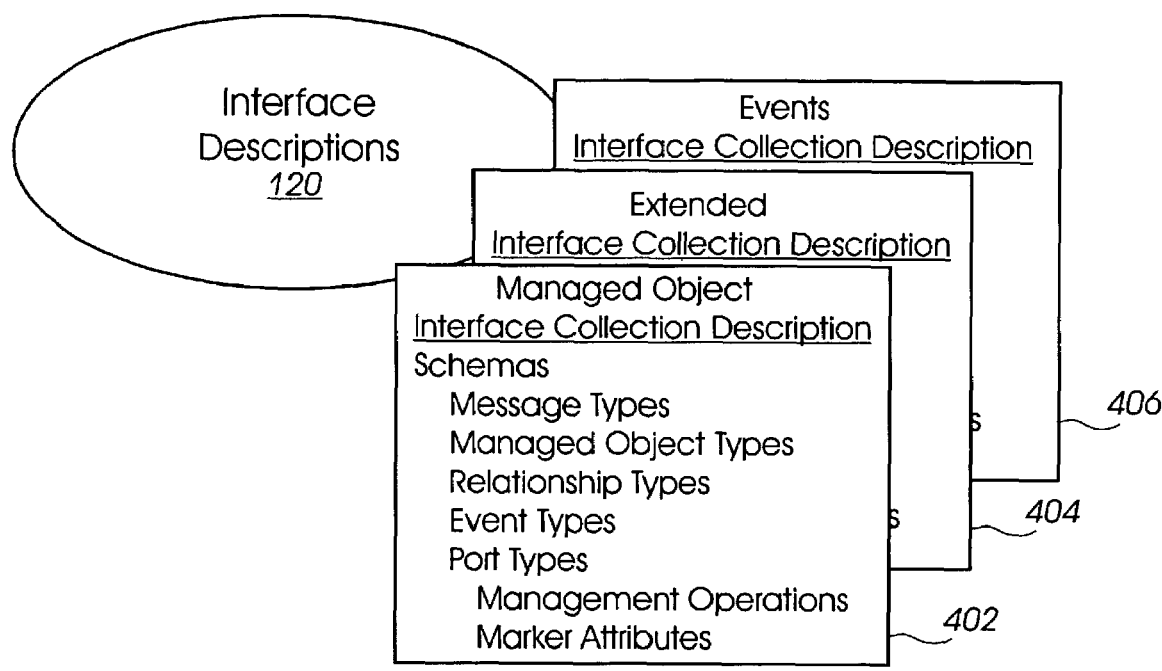
FIG. 4 is a diagram showing an embodiment of interface descriptions for a managed object interface collection.

Interface descriptions 120 provide a common framework for exposing management services for managed objects 108 regardless of the resources they represent. Interface descriptions 120 define management features available through interfaces 112, 114, 116 in a common format that can be used by other managed objects 108 and manager 102. In some embodiments, interface descriptions 120 define interfaces 112, 114, 116 in Web Services Description Language (WSDL), and messages between manager 102 and managed objects 108 can be exchanged via the Simple Object Access Protocol (SOAP) protocol. Other suitable protocols and programming languages can be utilized to implement interface descriptions 120. FIG. 4 shows examples of items that can be included in schemas for interface descriptions 120 including managed object interface collection description 402, Event Interface Collection description 404, and extended interface collection description 406. Other suitable formats and protocols can be utilized. Referring back to FIG. 1, manager 102 can discover interface descriptions 120 for interfaces 112, 114, 116 via any suitable discovery agency 118, such as UDDI, or other suitable method.

Managed objects 108 can themselves be utilized as Web services by manager 102. Web services can be document-oriented endpoints or method-oriented endpoints. The XML messages exchanged with a document-oriented Web service contain an XML document, and all message semantics are application-defined. An example of document-oriented Web services is discovery agencies 118, which provide interface descriptions 120 to manager 102. With method-oriented Web services, such as managed objects 108, remote procedure call (RPC) handler 124 can be implemented to transmit and receive messages corresponding to a RPC. Message(s) pass inbound from manager 102 to one or more of managed objects 108 and contain the method identifier and any input parameters. The information in the message is used to map to a method call in the appropriate native programming language for the underlying resource, and to execute the method with the supplied input parameters. After the method executes, another message passes outbound from managed object(s) 108 to manager 102 and contains the method identifier, the result of executing the method, and any output parameters (or exception information in the case of an error).

RPC handler 118 can be included to handle messages containing responses and requests between manager 102 and managed objects 108. RPC handler 118 can alleviate the need for a developer to write, transmit, interpret, and correlate messages by hand, and then map them to and from various native programmatic types used by the underlying resources. A common XML messaging protocol for RPCs is the Simple Object Access Protocol. In some embodiments, a Java application program interface (API) for XML-based remote procedure calls (JAX-RPC) can be used to implement RPC handler 124 and call SOAP-based Web services described by the Web Services Description Language (WSDL). Other suitable remote procedure call facilities, programming languages, application programming interfaces, and protocols can be utilized to implement RPC handler 124 in addition to, or instead of, JAX-RPC and SOAP. RPC handlers 124 can be deployed as part of managed objects 108, or provided independently on a platform that can access the corresponding managed objects 108.

Figure 2:
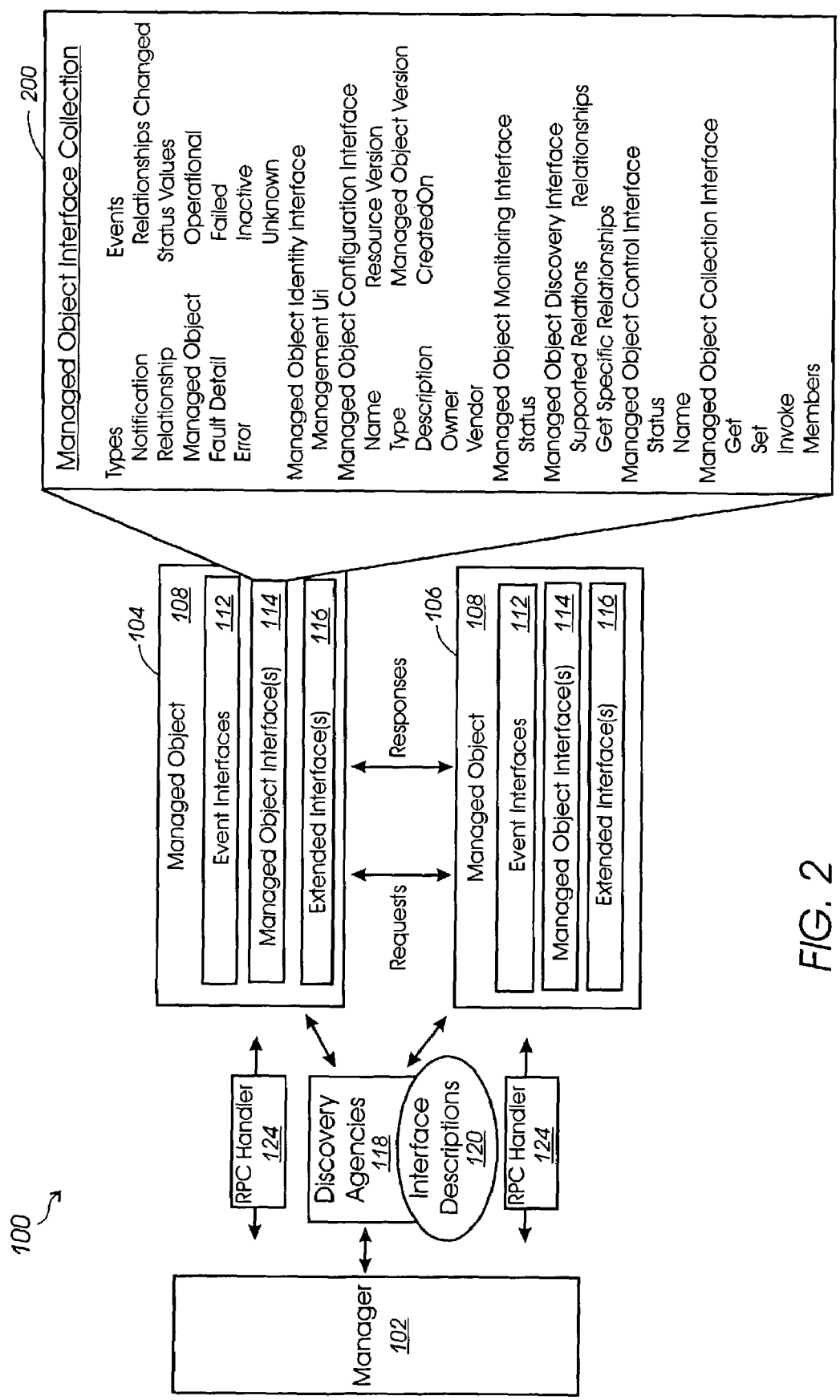
FIG. 2 is a diagram showing detail of an embodiment of managed object interfaces of FIG. 1.

Referring now to FIG. 2, in some embodiments, management capabilities provided via managed object interfaces 114 include attributes that represent information about managed objects 108; operations to support the management of managed objects 108; and events representing exceptions and state changes that can be reported by managed objects 108 to manager 102.

In some embodiments, each collection of managed object interfaces 114 supports various categories of management capabilities such as monitoring, discovery, control, performance, configuration, and security. Additional or fewer categories can be utilized. Further, other interfaces that support additional or different management capabilities can be utilized, in addition to, or instead of, managed object interfaces 114.

Several types of components can be used in managed object interfaces 114. The embodiment of Managed Object Interface Collection 200 shown in FIG. 2 includes Notification, Relationship, Managed Object, Fault Detail, and Error types that can be implemented in managed object interfaces 114. Attributes in Managed Object Interface Collection 120 can support types of access by other objects, such as read and read/write. When interface descriptions 120 are implemented in WSDL, and managed object interfaces 114 can be mapped to ports.

With regard to event notification system 100, Notification type can be used for event notifications that can be sent to manager 102. An element of FaultDetail type can be added to the fault detail element of all SOAP faults returned by managed object interfaces 114, and other interfaces associated with particular types of managed objects 108. Error type can describe an error. The Fault Detail element type can include one or more of the Error type elements to offer more specific information about the error.

The embodiment of Managed Object Interface Collection 200 shown also includes Status values and Events. For example, the type Relationships Changed Event can indicate an update to relationships in managed object 108. Relationships Changed Event can occur when a new relationship is added or when a previous relationship has been removed. Manager 102 can get an updated list of relationships by using the Relationships attribute in the Managed Object Discovery Interface as described herein.

With regard to Status values included in the embodiment of Managed Object Interface Collection 200 shown in FIG. 2, Operational status can indicate the underlying resource is operational and ready to process incoming messages. Failed status can indicate managed object 108 has detected a problem and the underlying resource is unable to process incoming messages. Inactive status can indicate underlying resource has terminated normally. Unknown status can indicate the state of the underlying resource is unknown. An event notification can issue when the status value of a resource changes.

Interfaces shown in the embodiment of Managed Object Interface Collection 200 of FIG. 2 include Managed Object Configuration Interface and Managed Object Monitoring Interface, among others. Managed Object Configuration Interface can include components such as attributes regarding the configuration of associated managed object 108, for example, Name, Type, Description, Owner, Vendor, Resource Version, Managed Object Version, and Created On.

Various features in the embodiment of managed object interfaces 114 shown can be used to support event notification system 100. Other features can be used to support other aspects of a system for managing IT resources, as further described in the disclosure entitled "System and Method For Collectively Managing Information Technology Resources," U.S. application Ser. No. 10/445,157.

Figure 3:
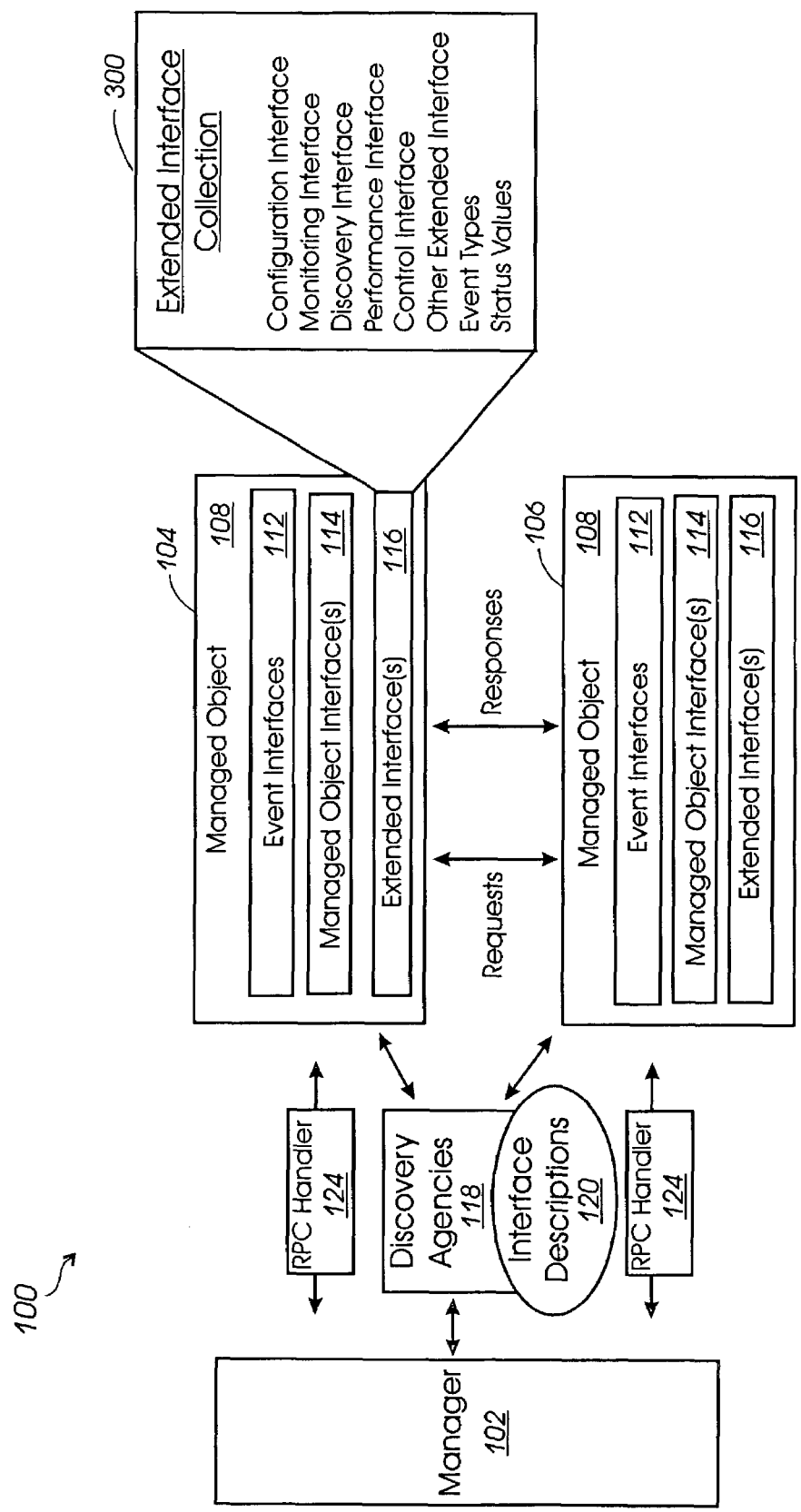
FIG. 3 is a diagram showing detail of an embodiment of extended interfaces of FIG. 1.

Referring to FIGS. 3 and 4, extended interfaces 116 can be implemented to extend managed object interfaces 114 to manage additional aspects of respective managed objects 108. In some embodiments, interface descriptions 120 define schemas for messages and corresponding WSDL parts; port types; marker attributes; and namespaces. Port types describe a list of potential management capabilities for manager 102. Ports that implement some or all of the port types defined in interface descriptions 120 allow managed objects 108 to expose their management capabilities and provide manager 102 with instructions for using the management capabilities. Managed objects 108 can expose different portions of the management interfaces to different managers 102. Note that extended interface collection 316 can use none, some, or all of the interface categories shown, as well as other categories of interfaces. Additionally, various status values and event types can be defined in extended interface collection 316 that pertain to the management of resources underlying managed object 108.

To extend resource management system 100 (FIG. 1) by defining new events for a particular resource, an identifier, such as a URI, can be included in extended interface collection 300 and, where applicable, in corresponding extended interface collection description 406, to represent the new event. For example, an interface collection for a conversation between managed objects 108 can be implemented to support the following event types with the respective URIs:

```
//urn:Event/IncorrectMessageReceived
//urn:Event/ParticipantFailure
//urn:Event/RemoteFailure
//urn:Event/LocalFailure
```

Other examples of events that can be included in extended interfaces are described in the disclosure entitled "System and Method For Managing Web Services," U.S. application Ser. No. 10/438,716, which is incorporated herein by reference.

DISTRIBUTED BUSINESS PROCESSES EXAMPLE

Figure 5:
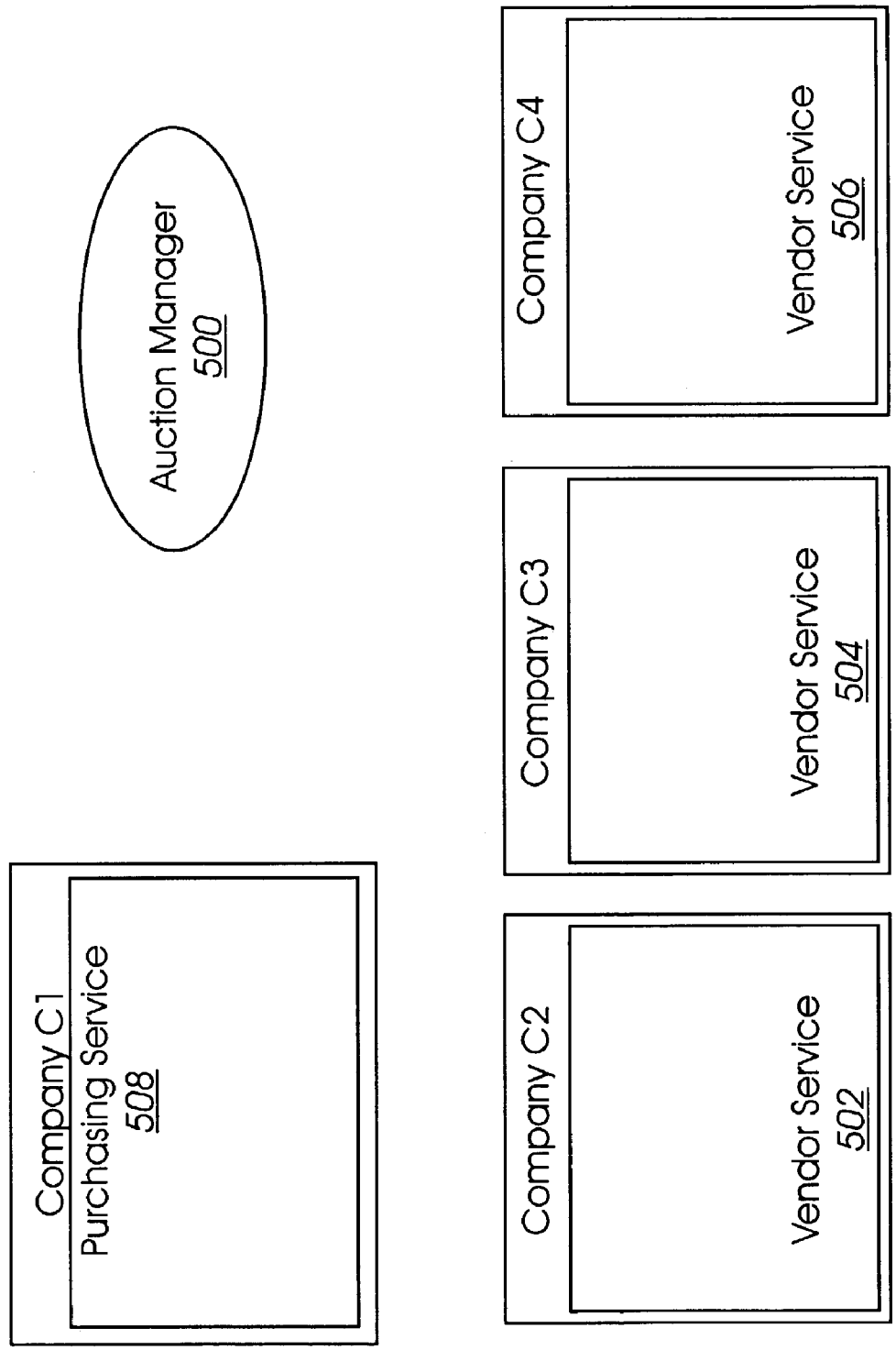
FIGS. 5 and 6 show diagrams of four independent entities capable of coordinating distributed Web services that can be monitored by a manager.
Figure 6:
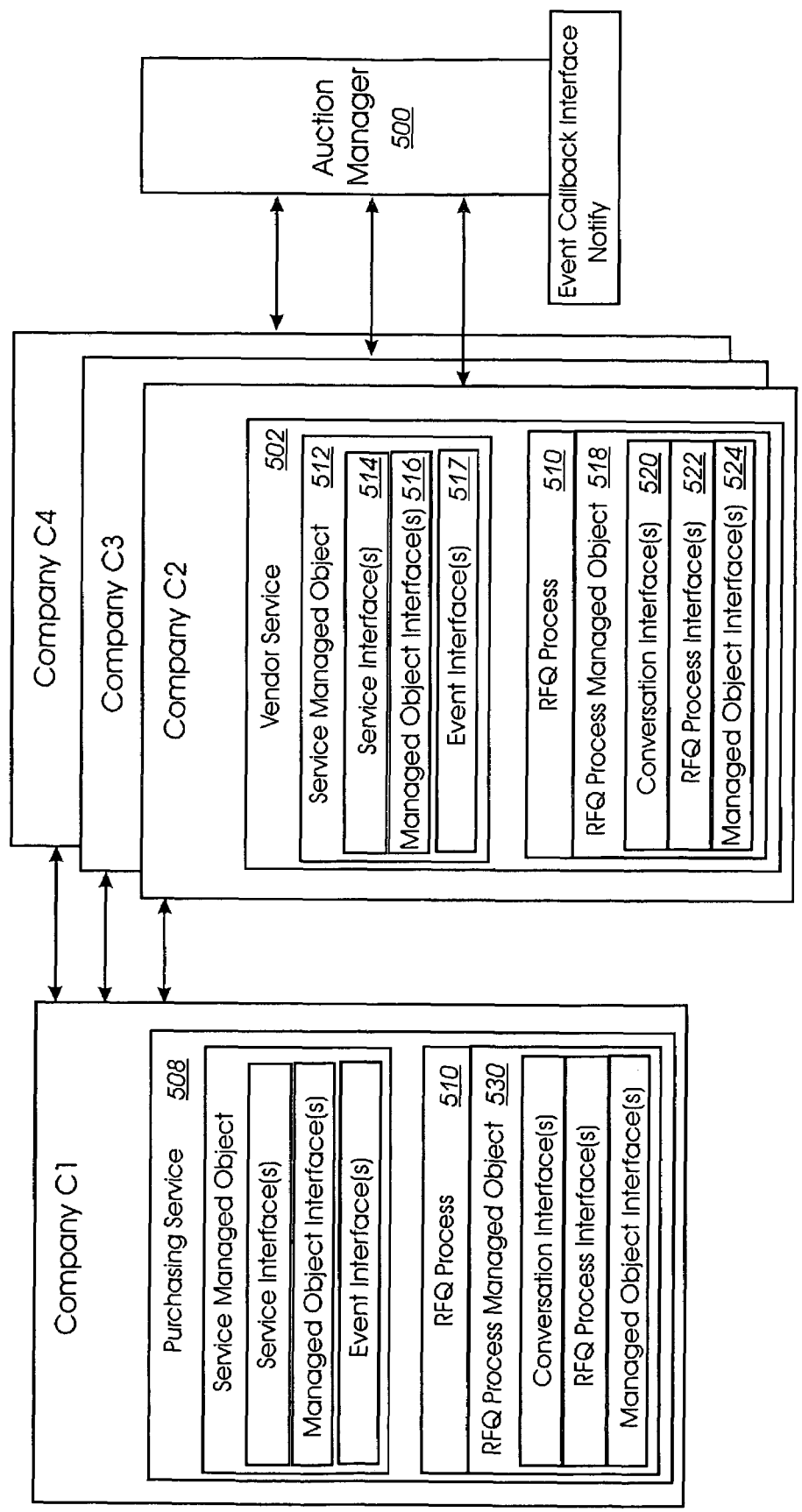

As an example of the use of event notification system 100 to provide a common, consistent facility for event notifications to managed objects 108, FIGS. 5 and 6 show diagrams of distributed business processes with four independent Web services that can be monitored by auction manager 500. Companies C2, C3, and C4 provide vendor services 502, 504, 506 to bid on items specified in requests for quotes (RFQs) from purchasing service 508 at Company C1. The distributed process of submitting and responding to the RFQs is shown as RFQ Process 510 in FIG. 6.

Auction manager 500 offers a management service that monitors the progress of RFQ Process 510. The business logic and operational processes are performed through purchasing service 508 at Company C1 and vendor service objects 502, 504, 506 from Companies C2, C3, and C4, respectively.

Auction manager 500 has an agreement with Companies C1, C2, C3, and C4 in which auction manager 500 defines RFQ process 510 for Company C1's purchasing service 508 to submit the RFQ, and for Companies C2, C3, and C4 to respond to the RFQ. In one embodiment, RFQ process 510 is implemented in the Business Processes Execution Language (BPEL). BPEL is an XML-based language designed to enable task sharing for a distributed computing environment, even across multiple organizations, using a combination of Web services. A developer formally describes a business process that will take place across the Web in such a way that any cooperating entity can perform one or more steps in the process the same way. In a supply chain process, for example, a BPEL program might describe a business protocol that formalizes the pieces of information in a product order, and the exceptions that may have to be handled. Other suitable specifications for implementing RFQ process 510 can be utilized, in addition to, or instead of, BPEL.

Auction manager 500 monitors RFQ process 510, which choreographs the flow of messages for the bidding until the bidding terminates. Vendor service 502, which is also representative of vendor services 504 and 506, includes service managed object 512 with service interfaces 514, managed object interfaces 516, and event interfaces 517. Vendor service 502 also includes RFQ process 510, with RFQ process managed object 518, conversation interfaces 520, RFQ process interfaces 522, and managed object interfaces 524. Managed object interfaces 524 include information regarding RFQ process 510, including the relationship of RFQ process 510 with respect to vendor service 502. Companies C2, C3, and C4 each provide auction manager 500 with a URI pointing to interface descriptions (not shown) for vendor services 502, 504, 506.

RFQ process interface 522 can be an extension to conversation interfaces 520. RFQ process 510 can therefore use attributes, operations, status values, and notifications defined in conversation interfaces 520, and managed object interfaces 524, as well as the extensions defined specifically for RFQ process 510. For purposes of this example, assume RFQ process interfaces 522 includes the following elements:

Get Global Process ID operation, which returns the global process ID (URI) for an instance of RFQ process 510. In some embodiments, the global process ID is the URI contained in the Context/Identifier element defined by WS-Coordination, which is a known framework for coordinating distributed application programs that form Web services. Other suitable identifiers can be used.

Get RFQ Process 41D operation, which returns the URI for a description of managed object interfaces 520, 522, 524 for the specific global process ID returned from the GetGlobalProcessID operation.

Process Step Completed notification, which issues an event notification to subscribing auction managers 500 when specified portions of each RFQ process 510 are completed.

Figure 7:
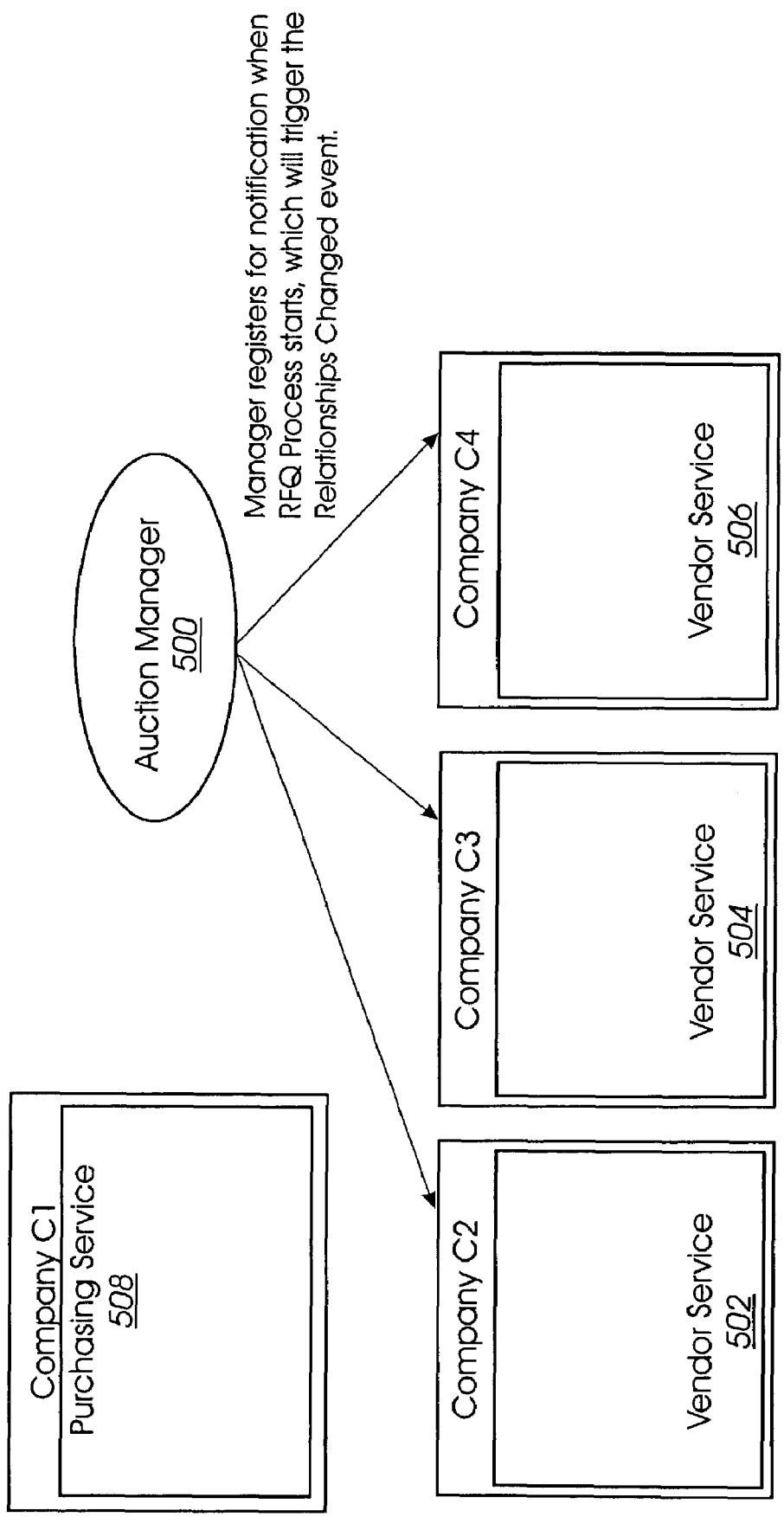
FIGS. 7 through 12 show diagrams of the distributed processing system of FIGS. 5 and 6 with annotations of various steps performed by RFQ process object and auction manager.

FIGS. 7 through 12 show diagrams of the distributed services of FIGS. 5 and 6 with annotations of various processes performed throughout the bidding process. In FIG. 7, auction manager 500 uses the identifier pointing to management object interface descriptions (not shown) that were provided by vendor services 502, 504, 506. Auction manager 500 registers for notification with vendor service managed object 512 (FIG. 6) using the Relationships Changed event notification in managed object interfaces 516 (FIG. 6).

Figure 8:
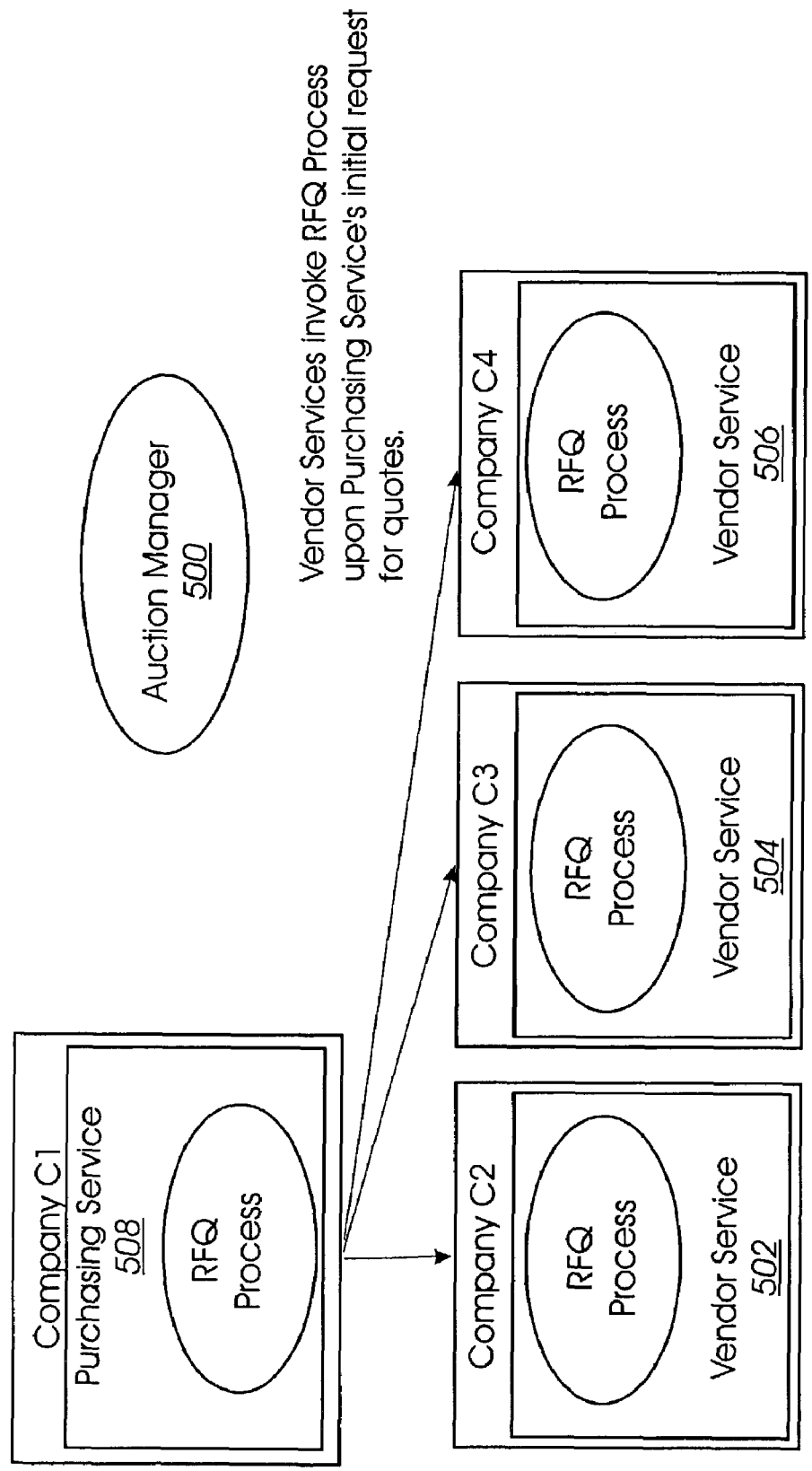

Referring to FIG. 8, purchasing service 508 knows that RFQ process 510 is available to buy selected items at a competitive price from participating vendors, such as Companies C2, C3, and C4. Purchasing service object 508 knows that auction manager 500 is available to monitor RFQ process 510, but does not necessarily know the identity of auction manager 500.

Based on the description of RFQ process 510, purchasing service 508 sends a RFQ document to vendor services 502, 504, and 506. Upon receiving the RFQ document, vendor services 502, 504, 506 invoke RFQ process 510, as shown in FIG. 8.

Figure 9:
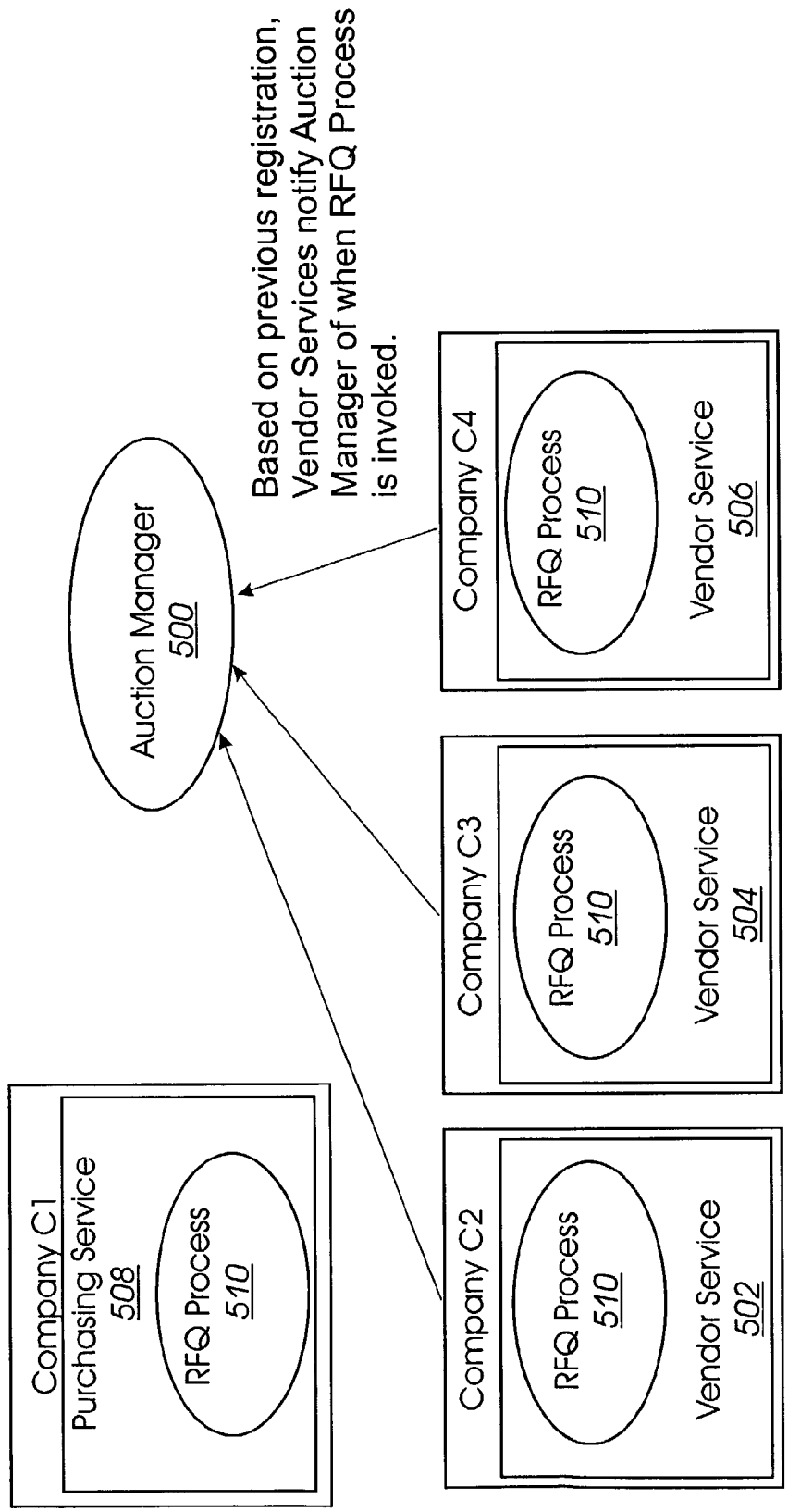

Referring to FIGS. 6 and 9, vendor services 502, 504, 506 send a notification to auction manager 500 when RFQ processes 510 begin executing. The notification includes a link to managed object interfaces 524. When the notification arrives, auction manager 500 retrieves a description of managed object interfaces 524 for RFQ process 510 using information in the notification. The interface description defines interfaces 520, 522, 524 for auction manager 500. Auction manager 500 discovers related service managed objects 512 via the Relationship attribute in managed object interfaces 524. Auction manager 500 can then invoke the management features for RFQ process 510 in RFQ process interfaces 522, as well as in managed object interfaces 524, service interfaces 514, managed object interfaces 516, and conversation interfaces 520.

Auction manager 500 can then call the Get Global Process ID operation in RFQ interfaces 522 for each RFQ process 510. The Get Global Process ID operation returns the same global ID for RFQ process 510, thus allowing the Auction Manager 500 to logically represent the separate instances of RFQ process 510 as the same process. In some embodiments, auction manager 500 utilizes bulk operations such as the Get, Set, and Invoke Operations in Managed Object Interface Collection 200 (FIG. 2) to streamline the process of issuing requests to each instance RFQ Process 510. For example, auction manager 500 can use the Invoke Operation in Managed Object Interface Collection 200 (FIG. 2) to invoke the Get Global Process ID operation on each instance of RFQ Process 510. The bulk operations can be invoked on managed object, such as RFQ Process Managed Object 518. RFQ Process Managed Object 518 then issues the request to all managed objects, also referred to as members, specified in the bulk request.

Figure 10:
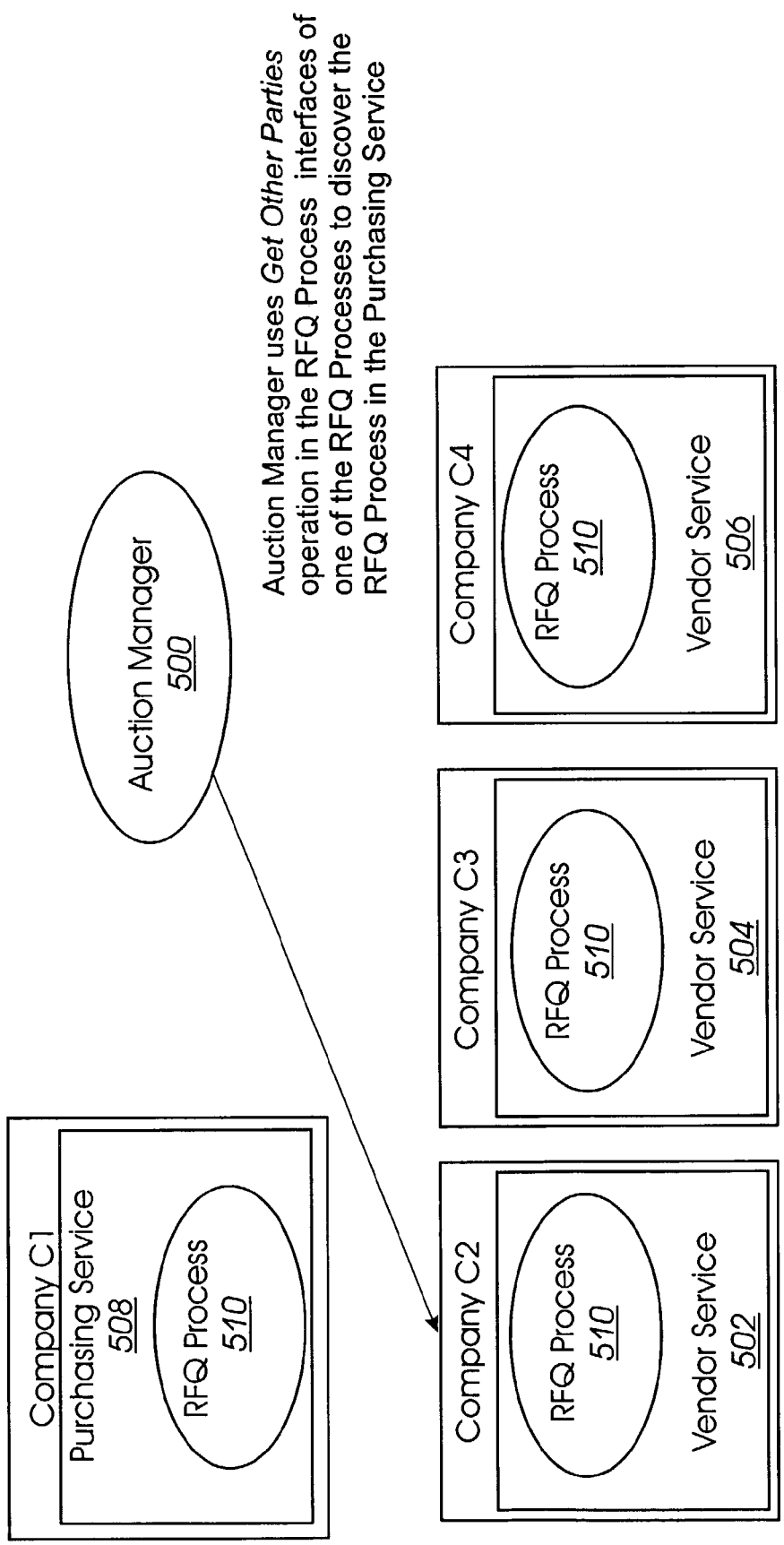

Referring to FIGS. 6 and 10, auction manager 500 invokes the Get Other Parties operation in conversation interfaces 520 for one of the three vendor companies. The Get Other Parties operation returns the identification for the three vendor services 502, 504, 506, plus purchasing service 508. Using this information, auction manager 500 retrieves a description of managed object interfaces 516 for vendor service object 502. Auction manager 500 then invokes the Get RFQ Process 41D operation in RFQ process interfaces 522, passing the global process ID provided by the vendors C2, C3, C4. The Get RFQ Process 41D operation returns a link to RFQ process managed object 530 for purchasing service 508 to auction manager 500.

In situations where the vendors are not aware of each other, auction manager 500 can call the Get Other Parties operation in RFQ process managed object 518, which returns IDs for each vendor service 502, 504, 506. Auction manager 500 can then call the Get RFQ Process 41D operation in RFQ process interfaces 522 to retrieve all managed object interfaces 524 for each vendor service 502, 504, 506. In some embodiments, auction manager 500 utilizes the Invoke Operation to invoke the Get Other Parties and Get RFQ Process 41D operations in each instance of RFQ Process 510.

At this point, discovery is complete and auction manager 500 has discovered vendor service managed objects 512 and RFQ process managed object 518 for vendor services 502, 504, 506.

Figure 11:
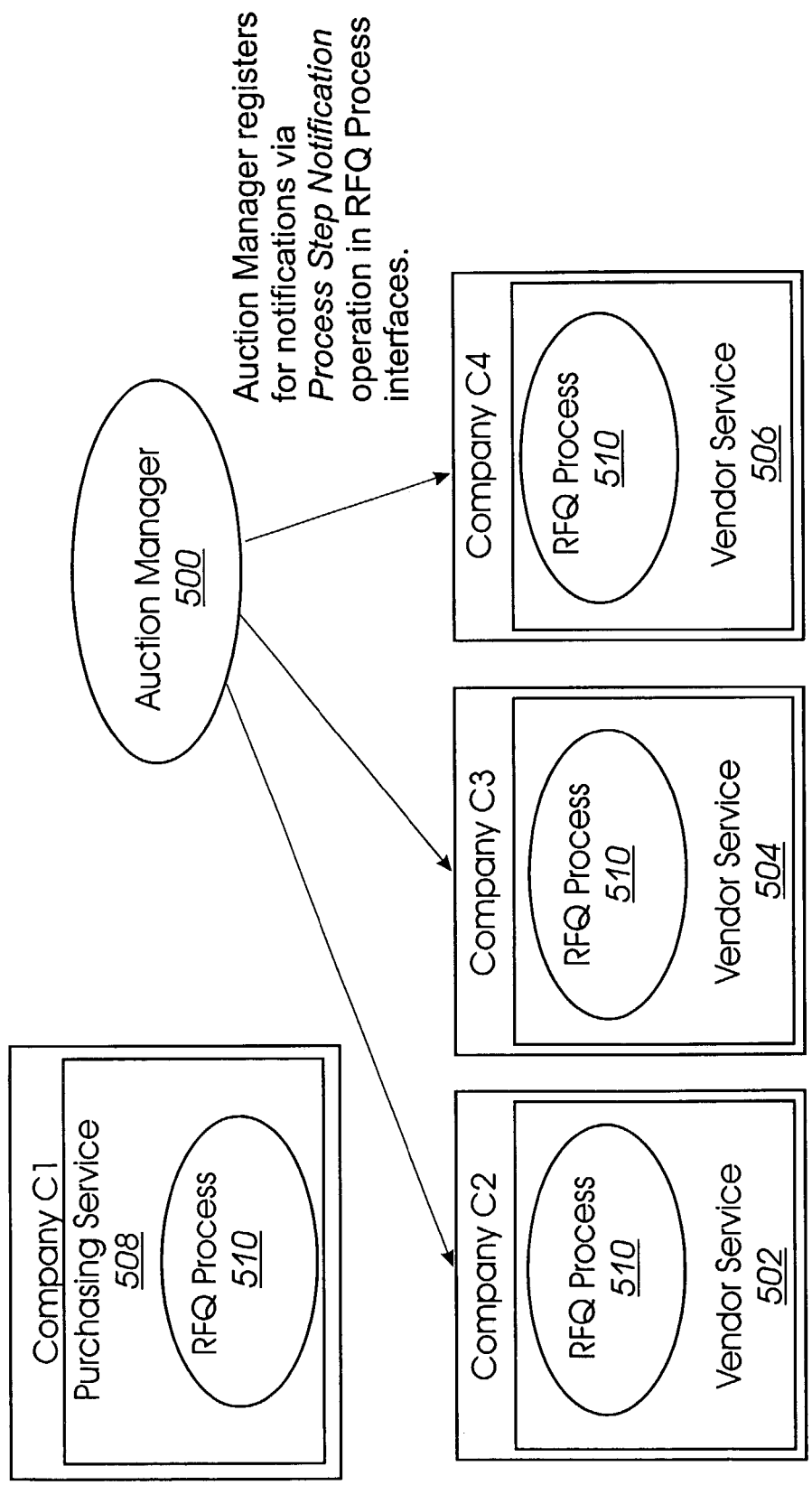

Auction manager 500 then uses the Process Step Completed notification in RFQ process interfaces 522 to register for notification every time a new step is completed, as shown in FIG. 11. In this manner, auction manager 500 can monitor the progress of RFQ process 510. In some embodiments, auction manager 500 utilizes the Invoke Operation in managed object interfaces 524 to invoke the Process Step Completed operations in each instance of RFQ Process 510 with one request.

Figure 12:
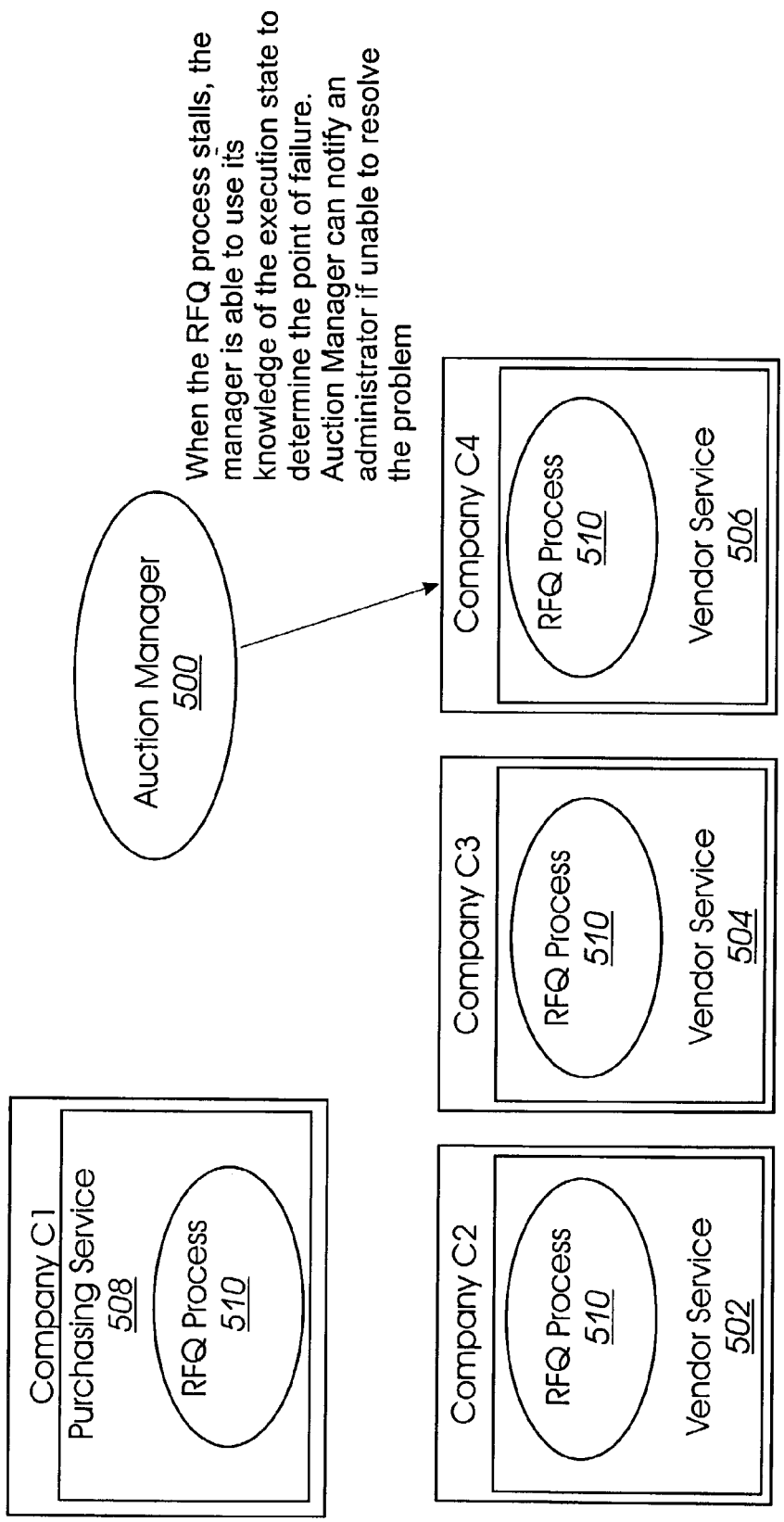

The Process Step Completed notification in RFQ process interfaces 522 continuously updates auction manager 500 as each step in RFQ process 510 is completed for each vendor service 502, 504, 506. Referring to FIG. 12, if RFQ process 510 stalls because, for example, vendor service 506 is not sending a message that is expected, auction manager 500 can determine the cause of the problem using managed object interface 524 for vendor service 506. Auction manager 500 sends a Status request to vendor service 506. When vendor service 506 does not reply within a prespecified time, the problem can be reported to a human operator at auction manager 500. The operator can contact an operator at Company C4 to solve the problem. The transaction can be completed once Company C4 fixes the technical problem.

Referring again to FIG. 1, any type of IT resource can be configured with managed object 108, event interfaces 112, managed object interfaces 114, as well as one or more extended interfaces 116 to allow manager 102 to access management features for the underlying resource(s). While event interfaces 112 and managed object interfaces 114 provide access to a common set of event notification features that are selectively available for any type of resource based on the access rights of manager 102, the extended interfaces 116 can be implemented to provide manager 102 with selective access to any additional management features available for the resource. Further, managed objects 108 can provide a common framework for managing resources both internal and external to an enterprise, and across domains 104, 106.

The events, types, operations, and attributes disclosed herein are examples of features that can be included in management interfaces, such as event interfaces 112 and managed object interfaces 114. Other features can be implemented for management interfaces in addition to, or instead of, the examples of features disclosed herein. Further, the names for the interfaces, attributes, events, operations and other interface features disclosed herein are provided for purposes of illustration only. The same names can be used to represent different features, and other names can be implemented to represent features disclosed herein.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components have been discussed as separate and discrete components. These components may, however, be combined to form larger, smaller, or different integrated circuits, software modules, or electrical assemblies, if desired.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims.

In the claims, unless otherwise indicated the article "a" is to refer to "one or more than one".

We claim:

1. A system for issuing event notifications, comprising:
   a computer processor;
   a first managed object executable on the computer processor, wherein the first managed object is a Web service and includes:
      an event interface configured to allow a manager to:
         query the types of events that can occur during execution of the first managed object;
         allow a manager to subscribe to selected types of events;
         notify the at least one manager of the occurrence of the selected types of events;
         expire the manager's subscription to the selected types of event after a predetermined time limit;

a managed object interface that includes information regarding relationships between the first managed object and other managed objects;

an extended interface that includes information based on the type of resource being managed; and an interface description that defines the management features available to the manager via the event interface.

2. The system of claim 1, wherein the notification includes:

an identifier of the first managed object issuing the notification;

at least one of the group of:
 classification of the notification; and
 an identifier for the notification; and at least one of the group of:
 the time the notification was issued;
 the time the associated event will last; and
 the time the notification will expire.

3. The system of claim 1, wherein the first managed object is configured to cache notifications of the events subscribed to by the manager when at least one of the subscribed events occurs, and to transmit the cached notifications to the manager upon request from the manager to transmit the notifications.

4. The system of claim 1, wherein the first managed object exposes a plurality of events, and the first managed object is configured to transmit notifications of the events subscribed to by the at least one manager when at least one of the subscribed events occurs.

5. The system of claim 3, wherein the event interface is configured to include event information in at least one of the following criteria: since a specific event occurred; events that occurred since a specified date; and events that occurred between a specified range of dates.

6. The system of claim 1, wherein the first managed object is further configured to receive a request to cancel the subscription to a specified event from the manager.

7. The system of claim 3, wherein the cached notifications are discarded when the subscription ends.

8. The system of claim 1, wherein the manager can subscribe to more than one event in a single subscription request.

9. The system of claim 1, wherein the manager can renew a subscription before the subscription expires.

10. The system of claim 1, wherein the notifications from more than one event are transmitted to the manager at one time.

11. The system of claim 1, wherein messages are exchanged via the simple object access protocol (SOAP).

12. The system of claim 1, wherein the interface description is formatted according to a Web services description language (WSDL).

13. The system of claim 1, wherein the notification message can be extended to include information regarding a status value associated with the at least one event.

14. The system of claim 1, wherein one of the events indicates that the first managed object has invoked another managed object.

* * * * *